Aug. 28, 1962 P. W. LENNOX 3,051,931

INTELLIGENCE STORAGE EQUIPMENT

Filed May 1, 1959 3 Sheets-Sheet 1

*Inventor*
P.W.LENNOX

By Robert Harding Jr.
*Attorney*

Aug. 28, 1962 P. W. LENNOX 3,051,931

INTELLIGENCE STORAGE EQUIPMENT

Filed May 1, 1959 3 Sheets-Sheet 2

*Inventor*
P.W.LENNOX

By [signature]
*Attorney*

Aug. 28, 1962 P. W. LENNOX 3,051,931

INTELLIGENCE STORAGE EQUIPMENT

Filed May 1, 1959 3 Sheets-Sheet 3

*Inventor*
P.W.LENNOX

*By* Robert Hardey Jr.
*Attorney*

United States Patent Office 3,051,931

Patented Aug. 28, 1962

3,051,931

INTELLIGENCE STORAGE EQUIPMENT

Peter William Lennox, London, England, assignor to International Standard Electric Corporation, New York, N.Y., a corporation of Delaware Filed May 1, 1959, Ser. No. 810,292
Claims priority, application Great Britain May 23, 1958
9 Claims. (Cl. 340—174)

The present invention relates to intelligence storage equipment of the type in which intelligence is stored in an array of ferro-magnetic elements, and also to ferro-magnetic units for use in such equipment.

According to the present invention there is provided a ferro-magnetic unit, such as may be used in intelligence storage equipment, which comprises a magnetic switching element and a number of further magnetic elements whose state of magnetisation is to be controlled at least in part by the state of magnetisation of said magnetic switching element, and in which said further magnetic elements are disposed around the periphery of said magnetic switching element and in close proximity thereto, the arrangement being such that the turns of a winding threading said magnetic switching element can include a plurality of turns each of which also threads one of said further magnetic elements.

The invention will now be described with reference to the accompanying drawings, in which.

Figure 1:
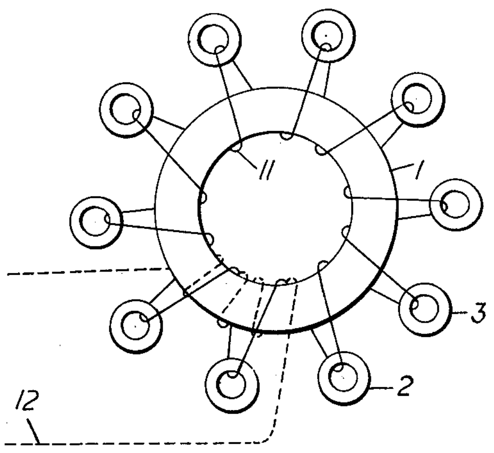
FIG. 1 shows in plan view a first embodiment of the present invention.

In one known form of storage array, there is a co-ordinate array of individual elements each of a square-loop ferro-magnetic material, and access to the array is parallel. That is, when it is desired to select a row of elements of the array, a select condition or read pulse is applied to a row wire which threads all of the elements of that row of the array. This pulse is large enough, in the correct direction, to set all elements to which it is applied to their states of magnetisation which represent 0. Therefore large output pulses are produced on the column wires which thread the elements of the read row which were in their "1" states of magnetisation when the row was pulsed, and small or no pulses occur on column wires which thread elements of that row which were at 0. If it is desired to record intelligence in the selected row, then the read pulse is followed, after a short pause, by a half-write pulse, i.e. a pulse which is in the direction appropriate to the setting of the elements to which it is applied to their "1" states, but of half the necessary amplitude. Similar pulses are co-incidentally applied to the column wires which thread those elements of the selected row which are to be set to "1." Thus the intelligence in the selected row can be read out for use by associated equipment, or read out and replaced by fresh intelligence, or even cancelled from the array.

Such a co-ordinate array can also be used as a buffer store for detecting meter pulses due to calls from a group of subscriber's lines in a telephone exchange. In such a case, each element of the array is individual to a subscriber's line and is connected thereto in such a way that a meter pulse due to a call by that subscriber's line sets that line's element to its "1" condition. To transfer these meter pulses to a meter store where they are accumulated, the array is read by selecting its rows successively. On each selection of a row, any meter pulses stored therein are read out to be dealt with by the associated equipment. Arrangements of this nature are described in French Patent No. 1,222,553.

A co-ordinate array such as has been described is controlled by a further co-ordinate array of magnetic elements acting as an access switch, so called because it controls access to the elements of the storage array. Each element of the access switch has an individual output winding which is connected to a row wire of the storage array. Therefore to read the contents of a row of the storage array, the access switch element for the "wanted" row is selected, and the selection of this element causes a select condition or read pulse to be applied to that row's row wire. In the first-mentioned example of the use of a storage array, the read pulse so produced is followed by a half-write pulse but in the second mentioned example, no such half-write pulse is necessary.

The present invention provides a unit which may be used in constructing such storage equipment. In such a unit, the individual magnetic elements which form a row of the array are grouped around the periphery of the somewhat larger magnetic element which forms that row's access switch element. Each turn of the output winding of the access switch element passes through one of the storage elements, so that the same winding forms the access switch element's output winding and the row drive windings for all elements of the row. When a number of such units are assembled to form a store plus access switch, the storage array column wires pass directly through the appropriate ones of the storage elements, and the access switch elements carry other windings which are suitably interconnected to form a co-ordinate access switch.

As will be seen, the magnetic elements can be individual toroidal cores, or can each consist of the material which surrounds a hole in a plate or block of square-loop ferro-magnetic material. It should be noted that units according to the present invention could each form a column of storage elements plus access switch element. It should further be noted that the units of the present invention could be used for controlling a storage array in which elements are selected individually. In this case, each unit would consist of a single row (or column) of storage elements, with its access switch element, the column (or row) selection using further access means.

In FIG. 1, 1 represents a toroidal core which forms one element of an access switch which controls the selection of a row of a co-ordinate array of ferro-magnetic storage elements. This core, in one specific construction, has an outside diameter of 240 mils (slightly less than a quarter of an inch) and an inside diameter of 120 mils. Around the periphery of the core 1, are disposed storage elements formed by the small toroidal cores 2, 3. Each of these latter has an outside diameter of 80 mils and an inside diameter of 40 mils. In the example shown in FIG. 1, there are ten such cores, i.e. each row of the store for which the unit of FIG. 1 was constructed consists of 10 cores.

The output winding of the access switch element 1 is represented by the line 11, which passes repeatedly through and around the element 1 so as to form a ten-turn winding therefor. As can be seen from FIG. 1, each of these turns also passes through one of the storage elements. Thus the winding 11 not only forms the output winding of the access switch element 1, but also forms the row (drive) windings for all elements of a row of the storage array.

The column windings for the individual storage elements are not shown in FIG. 1. However, each of these windings is a single wire passed through that element. If the storage array is not of the parallel-access type described at some length above, there is also provided an output winding which passes through all elements of the co-ordinate array. In the latter case, if the co-ordinate array is one of a number of such arrays controlled together, i.e. a three-dimensional array, there is also provided an "inhibit" winding which passes through all elements of each co-ordinate array of the three-dimensional array. Such "inhibit" windings are well known in the art.

The selection of the access switch element to be energised to select the wanted row is on a co-ordinate basis, there being row and column windings on the access switch elements. One of these windings is indicated schematically by the broken line 12. Here also it should be mentioned that if single turn windings are adequate for the access switch, then they would be formed by wires passing through the element 1.

One convenient method of assembling an array such as that shown in FIG. 1 is to place the access switch element 1 on the adhesive side of a piece of adhesive insulating tape, and then to place the storage elements on the tape each in its intended position. These elements are all retained in position by the "stickiness" of the tape. A second piece of tape is then placed, adhesive side down, over the elements. Any elements which carry individual windings have these wound on before they are put on the tape. A number of such groups of elements can be assembled on one long strip of tape. To form such an assembly into a store plus access switch, the tape is folded, after which the column and other wires are pushed through holes in the tape and elements, and the various winding interconnected as required.

Another method of assembly is to cast each access switch element and its associated storage elements into a solid insulating material.

The carriers of FIGS. 2 to 5 will now be briefly described.

Figure 2:
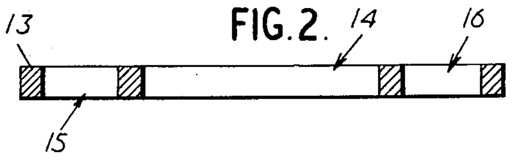
FIGS. 2, 3, 4 and 5 show in cross-section various forms of carrier used for assembling the embodiment of the invention shown in FIG. 1.

FIG. 2 is a cross-section of a circular washer 13 of an insulating material having one hole 14 which is just large enough to receive an access switch core, and 10 holes such as 15, 16. These are each large enough to receive a storage element core, and are arranged in a circle around the periphery of the hole 14. The thickness of the solid material between the holes 14 and the other holes is of the order of 20 mils. This circular perforated washer merely serves to hold the storage elements and the access switch element in the correct positions relative to one another for placing on them the winding 11, and also to protect the elements. To allow for winding the selection windings such as winding 12 (FIG. 1) on the access switch elements, additional holes or slots (not shown) are provided in the washer shown in FIG. 2.

Figure 3:
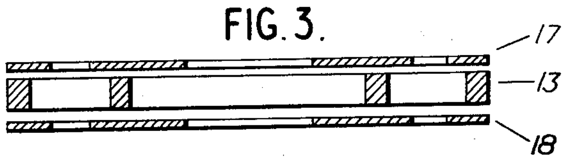

The carrier shown in FIG. 3 is similar to that of FIG. 2, with the addition of two retaining plates 17 and 18, one on each side of the washer 13. These plates serve to hold the toroidal cores (not shown) positively in their correct relative positions. These plates have holes which match with the holes such as 14—15—16, but are of some what smaller diameter, and also holes or slots to match with the additional holes or slots provided for the windings such as 12, FIG. 1.

Figure 4:
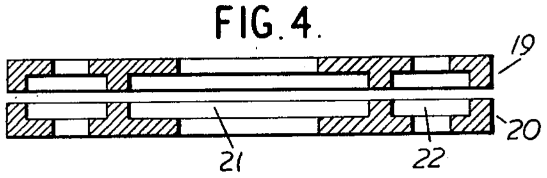

FIG. 4 shows a carrier consisting of two half-mould units 19, 20, each of which has a large cup or recess such as 21 to receive an access switch core, and ten small cups or recesses such as 22, each for the reception of a storage core. When the cores are assembled between the two mould cups 19, 20, and these cups are stuck together, the overall result is similar to that of FIG. 3.

Figure 5:
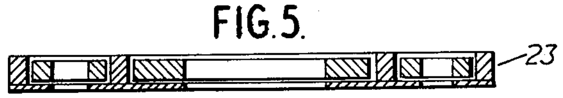

FIG. 5 is a carrier formed by a half-mould 23 whose cups or recesses are slightly deeper than the depth of the core. This half mould is formed of a thermoplastic material, and after the eleven cores have been placed in the eleven recesses, the upper surface of the half-mould is subjected to the action of a hot platen. This causes the material on the upper surface to run and form a retaining lip for the cores. It will be necessary to bore additional holes for the selecting windings for the access switch element.

It should be noted that if the associated circuitry of the access switch is such that single turn windings can be used, then no additional holes in the insulating material are necessary since in such a case the wires forming these windings are passed straight through the access switch elements.

Figure 6:
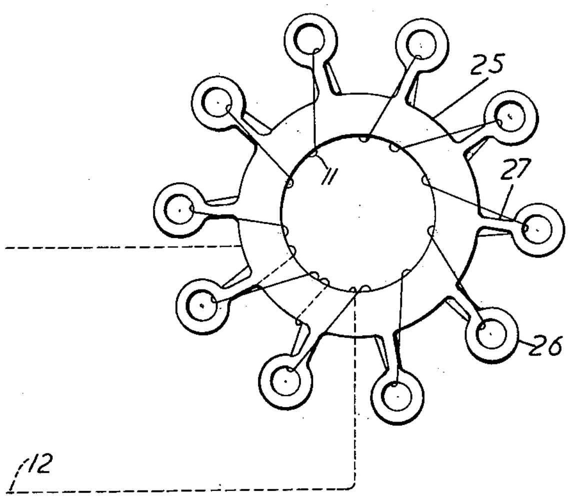
FIG. 6 shows in plan view a second embodiment of the present invention.

In the embodiment shown in FIG. 6, all of the elements of the unit are formed from one single piece of square-loop ferro-magnetic material. This includes a toroidal core 25, which forms the access switch element, and ten smaller toriodal cores such as 26, which forms the storage elements. Each storage element is connected to the access switch element by a narrow neck such as 27 of square-loop material. This neck could, with 80 mil storage cores and a 240 mil access switch element have a length of the order of 10 mils. That is, each storage core is stood off 10 mils from the periphery of the access switch core.

The width of the neck of square-loop material is similar to the length thereof.

Figure 7:
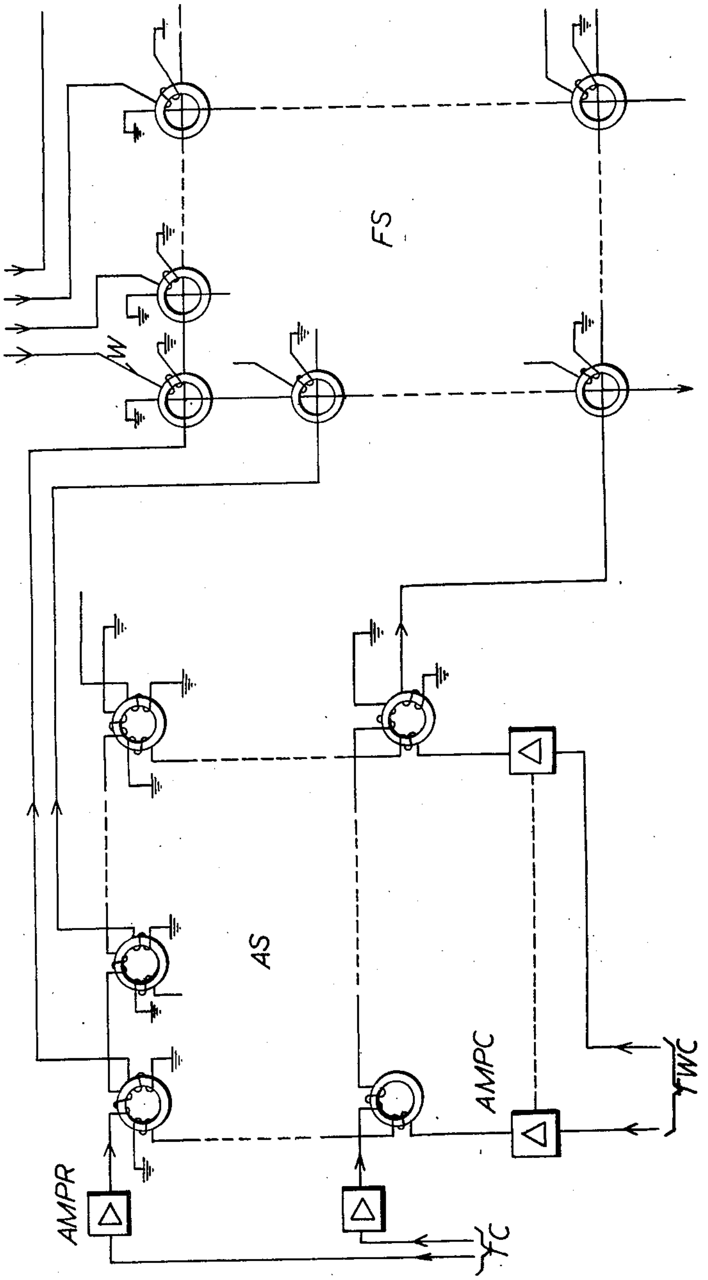
FIG. 7 shows a circuit diagram of a co-ordinate storage matrix and access switch using units such as that described with reference to FIG. 1.

FIG. 7 is an example of a storage array FS and access switch AS in which ferro-magnetic units according to the present invention are used. This arrangement, as already mentioned, is used as a buffer store in a metering arrangement for telephone subscribers, the complete arrangement being described in French No. 1,222,553. Each subscriber of the 1000 served by the arrangements shown is allotted one ferro-magnetic storage element. Each of these elements is a core of a square-loop ferrite having an outside diameter of 80 mils. These cores are arranged electrically, but not necessarily physically, in 100 rows of 10 cores each. Each core of the storage array FS has an individual winding such as W to which is connected the meter lead of a subscriber's line circuit. This connection is via a filter (not shown) which suppresses unwanted "noise" pulses which could otherwise cause false operation. When a meter pulse occurs, the current which flows in the individual winding of the appropriate caller's core sets that core to its operated condition.

The extraction of received meter pulses from FS is controlled by the access senders AS, which consists of a 10 x 10 co-ordinate matrix of square-loop ferrite cores, each of which has an outside diameter of 240 mils. Again the co-ordinate arrangement of these cores is electrical, but not necessarily physical. Each row of the cores is set by a pulse applied to its row wire from the appropriate one of the inputs marked TC, via an amplifier such as AMPR from its normal to its non-normal state. After a row of cores of AS have been so set, they are successively re-set by pulses applied to respective column wires from inputs TWC, via amplifiers such as AMPC. When a core is reset, the output so produced is applied via that core's output winding to a row of cores of the matrix FS. Any output due to the setting of a core of AS is cancelled by circuit means of well-known type but not shown. After all cores of a row of AS have been re-set, the next row of cores are set and then re-set sequentially. Hence the row wires of the matrix FS receive pulses sequentially.

Each pulse applied to a row wire of FS resets all cores of that row which were in the operated, or "meter pulse detected" condition to their normal conditions. For any core reset in this manner an output is obtained on its column wire, and these outputs are dealt with by the remainder of the metering equipment in the manner described in detail in the above-mentioned Franch patent.

For each row of the matrix FS there is provided one unit according to the present invention, each said unit consisting of the 10 cores of that row, plus the access switch core for that row of the matrix FS. As already described, each turn of the access switch core's output winding threads, and forms the drive winding for, a core of the matrix FS.

It should be noted that if the number of storage elements to be driven is greater than the number which can be accommodated arou d one access switch element, then two (or more) ferro-magnetic units such as have been described would form one row (or column, if the units are used for a column and its access switch element). Thus if the rows of a matrix each have 36 cores, each row could conveniently be found of three units each consisting of an access switch element with 12 storage elements. Then the selection of a wanted row of the storage matrix would be effected by driving the three access switch elements for that row in parallel.

The main advantages derived from the use of the present invention is that an access switch and storage array so constructed occupies less space than hitherto-known arrangements, and that the relatively long connections between the output winding of an access switch element and the windings of the storage elements controlled thereby are avoided. Thus the chance of pulses being "lost" due to such long connection when the equipment is being used at a relatively high frequency is reduced or even eliminated.

While the principles of the invention have been described above in connection with specific embodiments, and particular modifications thereof, it is to be clearly understood that this description is made only by way of example and not as a limitation on the scope of the invention.

What we claim is:

1. A ferromagnetic device, comprising a first magnetic element, having substantially rectangular hysteresis, with an aperture therein, a further plurality of similar magnetic elements, having subtantially rectangular hysteresis, disposed around the periphery of said first magnetic element in close proximity thereto, further comprising a winding including a plurality of turns which thread both the said first magnetic element and the said further magnetic elements.

2. A ferromagnetic device, as claimed in claim 1, in which the number of the plurality of turns threading said first magnetic element is equal to the number of the further plurality of magnetic elements, and in which said plurality of magnetic elements are each threaded by a different one of said plurality of turns.

3. A ferromagnetic device, as claimed in claim 1, in which the first magnetic element and the further plurality of magnetic elements are formed of homogeneous material in a single unit, each of said further plurality of magnetic elements being set off from the said first magnetic element by a narrow neck of the said homogeneous material.

4. A ferromagnetic device, as claimed in claim 1, in which the first magnetic element and the further plurality of magnetic elements are each formed as a toroidal core, said further plurality of magnetic elements each having a diameter less than said first magnetic element.

5. A ferromagnetic device, as claimed in claim 1, further comprising further windings on the first magnetic element for changing the state of magnetization of said first element.

6. A ferromagnetic unit as claimed in claim 4, in which the first ferromagnetic element core and the further plurality of ferromagnetic elements are mounted in a carrier of insulating material adapted to retain said further elements in said close proximity to said first element.

7. A ferromagnetic unit, such as may be used in intelligence storage equipment, comprising a magnetic switching element and a number of further magnetic elements in which said magnetic switching element and said further magnetic elements comprise a body of ferromagnetic material having substantially rectangular hysteresis provided with apertures therein associated with said elements, and in which the aperture of the magnetic switching element is of larger diameter than the apertures of the further magnetic elements, and in which said further magnetic elements are disposed around the periphery of said magnetic switching element and in close proximity thereto, each of said further magnetic elements being joined to the said magnetic switching element by a narrow neck of the rectangular hysteresis material, further comprising a winding, threading said magnetic switching element, including a plurality of turns each of which also threads a different one of said further magnetic elements, in which said elements are so proportioned that an appropriate output produced on said winding due to a change of the state of magnetization of said magnetic switching element is capable of changing the state of magnetization of all of said further magnetic elements.

8. A ferromagnetic unit, such as may be used in intelligence storage equipment, comprising a magnetic switching element formed by a toroidal core of substantially rectangular hysteresis ferromagnetic material, and a number of further magnetic elements each formed by a toroidal core of similar ferromagnetic material, the diameter of the core forming one of said further magnetic elements being less than the diameter of the core forming said magnetic switching element, and in which the cores which form said further magnetic elements are disposed around the periphery of the core which forms said magnetic switching element, and in close proximity thereto, further comprising windings, threading said magnetic switching element, including a plurality of turns each of which also threads one of said further magnetic elements, in which said cores are so proportioned that an appropriate output produced on said windings due to a change of the state of magnetisation of said magnetic switching element is capable of changing the state of magnetisation of all of said further magnetic elements.

9. An electrical intelligence storage arrangement comprising a coordinate array of *mn* storage elements each of which consists of a toroidal core of substantially rectangular ferromagnetic material, said storage elements being arranged electrically in *m* rows of *n* storage elements each, further comprising switching elements each of which consists of toroidal core of substantially rectangular ferromagnetic material, said switching elements each having a greater diameter than said storage elements, in which there are *m* switching elements each associated with one of said rows of storage elements, and in which each said row of *n* storage elements is disposed in close proximity and around the periphery of the associated switching element, and in which each of said switching elements carries an output winding of *n* turns, each turn of which in addition to threading said switching element also threads a storage element of said associated row, means for selecting a switching element and means comprising an input winding for changing the state of magnetisation of said switching element, and in which the selection of one of said *m* switching elements causes a select condition to be applied via that switching element's output winding to all of the storage elements with which that switching element is associated, and in which said cores are so proportioned that the output due to the selection of the switching element is of sufficiently large amplitude to be capable of changing the state of magnetisation of all the storage elements of the associated row.

References Cited in the file of this patent

UNITED STATES PATENTS

| | | |
|---|---|---|
| 2,776,419 | Rajchman | Jan. 1, 1957 |
| 2,818,555 | Lo | Dec. 31, 1957 |
| 2,882,524 | Spencer | Apr. 14, 1959 |
| 2,911,627 | Kilburn | Nov. 3, 1959 |
| 2,971,181 | Vogl | Feb. 7, 1961 |

FOREIGN PATENTS

| | | |
|---|---|---|
| 821,095 | Great Britain | Sept. 30, 1959 |